(12) United States Patent
Matsuda et al.

(10) Patent No.: US 9,073,760 B2
(45) Date of Patent: Jul. 7, 2015

(54) MANUFACTURING METHOD AND MANUFACTURING DEVICE FOR MULTIPLE OXIDE

(75) Inventors: Yuki Matsuda, Ome (JP); Shingo Katayama, Ome (JP)

(73) Assignee: SHOEI CHEMICAL INC., Tokyo (JP)

( * ) Notice: Subject to any disclaimer, the term of this patent is extended or adjusted under 35 U.S.C. 154(b) by 175 days.

(21) Appl. No.: 13/995,332

(22) PCT Filed: Dec. 20, 2011

(86) PCT No.: PCT/JP2011/079474
§ 371 (c)(1),
(2), (4) Date: Jun. 18, 2013

(87) PCT Pub. No.: WO2012/086631
PCT Pub. Date: Jun. 28, 2012

(65) Prior Publication Data
US 2013/0266495 A1    Oct. 10, 2013

(30) Foreign Application Priority Data
Dec. 24, 2010   (JP) .................................. 2010-287050

(51) Int. Cl.
*C01D 1/02*      (2006.01)
*C01G 49/02*    (2006.01)
(Continued)

(52) U.S. Cl.
CPC ................. *C01B 33/32* (2013.01); *C01B 13/14* (2013.01); *C01G 49/009* (2013.01); *C23G 1/08* (2013.01); *C01D 15/02* (2013.01); *C22B 26/12* (2013.01); *C01B 25/45* (2013.01); *C01B 33/20* (2013.01); *C01B 35/12* (2013.01); *H01M 4/485* (2013.01); *Y02E 60/122* (2013.01); *C23G 1/36* (2013.01)

(58) Field of Classification Search
CPC ........ C22B 26/00; C22B 26/10; C22B 26/12; C22B 7/007; C22B 3/04; C22B 3/06–3/10; C23G 1/08–1/088; C01D 15/02; C01G 49/009; C01G 49/02; C01B 13/14
USPC ........... 423/277, 332, 311–313, 593.1, 594.1, 423/594.2, 599
See application file for complete search history.

(56) References Cited

U.S. PATENT DOCUMENTS

2006/0127291 A1*   6/2006   Abazajian ................. 423/150.3

FOREIGN PATENT DOCUMENTS

| CN | 1775665 A | 5/2006 |
|---|---|---|
| CN | 1803591 A | 7/2006 |

(Continued)

OTHER PUBLICATIONS

Tugen Xu, et al; Synthesis and properties of low cost . . . ; Acta Chimica Sinica; 2009; vol. 67; No. 20; pp. 2275-2278 (English abstract).

(Continued)

*Primary Examiner* — Anthony J Zimmer
*Assistant Examiner* — Justin Bova
(74) *Attorney, Agent, or Firm* — Lucas & Mercanti, LLP

(57) ABSTRACT

A method for manufacturing a multiple oxide includes: a solution preparing step of adding to iron and steel pickling waste liquid, a lithium compound soluble in acidic aqueous solution and an oxoanion raw-material compound to prepare a mixed solution; a roasting step of introducing the mixed solution into a roasting furnace to roast the mixed solution; and a collecting step of collecting the multiple oxide obtained in the roasting step.

7 Claims, 6 Drawing Sheets

(51) Int. Cl.

| | | |
|---|---|---|
| *C01B 25/30* | (2006.01) | |
| *C01B 33/32* | (2006.01) | |
| *C01B 25/45* | (2006.01) | |
| *C01B 33/20* | (2006.01) | |
| *C01B 35/12* | (2006.01) | |
| *H01M 4/485* | (2010.01) | |
| *C23G 1/36* | (2006.01) | |
| *C01B 13/14* | (2006.01) | |
| *C01G 49/00* | (2006.01) | |
| *C23G 1/08* | (2006.01) | |
| *C01D 15/02* | (2006.01) | |
| *C22B 26/12* | (2006.01) | |

(56) References Cited

FOREIGN PATENT DOCUMENTS

| | | |
|---|---|---|
| CN | 1830765 A | 9/2006 |
| CN | 101154711 A | 4/2008 |
| CN | 101209822 A | 7/2008 |
| CN | 101481104 | 7/2009 |
| CN | 101651204 | 2/2010 |
| CN | 101724616 A | 6/2010 |
| CN | 101740776 A | 6/2010 |
| CN | 101752555 A | 6/2010 |
| JP | 05-033173 A | 2/1993 |
| JP | 5-170453 A | 7/1993 |
| JP | 05-175033 A | 7/1993 |
| JP | 5-320939 A | 12/1993 |
| JP | 06-293521 A | 10/1994 |
| JP | 07-003479 A | 1/1995 |
| JP | 2001-172021 | 6/2001 |
| JP | 2001-172021 A | 6/2001 |
| JP | 2004-095385 A | 3/2004 |
| JP | 2004-259471 A | 9/2004 |
| JP | 2009-070666 | 4/2009 |
| WO | 2005-095273 | 10/2005 |

OTHER PUBLICATIONS

L.N. Wang, et al; A simple, cheap soft synthesis routine for . . . ; Science Direct; Journ. of Power Sources; 2007; 167; pp. 200-205.

* cited by examiner

COARSE POWDER OF MULTIPLE OXIDE
↓
PULVERIZED STEP
↓
ANNEALING STEP
↓
FINE POWDER OF MULTIPLE OXIDE

US 9,073,760 B2

MANUFACTURING METHOD AND MANUFACTURING DEVICE FOR MULTIPLE OXIDE

CROSS REFERENCE TO RELATED APPLICATION

This Application is a 371 of PCT/JP2011/079474 filed on Dec. 20, 2011, which claims the priority of Japanese Patent Application No. 2010-287050 filed on Dec. 24, 2010, both applications are incorporated herein by reference in their entirety.

TECHNICAL FIELD

The present invention relates to a manufacturing method and manufacturing device for a multiple oxide, which method and device utilize pickling waste liquid for iron and steel, and more specifically, relates to a method and device which utilize the iron and steel pickling waste liquid to produce a large amount of cathode (positive-electrode) material of lithium-ion secondary batteries with less burden on the environment at lower cost than conventional ones.

BACKGROUND ART

As conventionally known, in an iron and steel manufacturing process, iron-containing pickling waste liquid is discharged from a bath of a pickling device in a steel pickling line, and the pickling waste liquid is roasted in a roasting furnace to produce iron oxide ($Fe_2O_3$) and acidic gas such as hydrochloric acid. The produced iron oxide is recovered as red iron oxide, raw materials for soft ferrite and hard ferrite, or the like. On the other hand, the furnace gas containing hydrochloric acid or the like is brought into contact with water to be subjected to an acid recovery process, and the recovered acid is returned to the bath of the pickling device (Non-Patent Literature 1).

In conventional iron and steel manufacturing processes, various processing methods and devices have been proposed or improved only from the perspective of efficient processing of produced waste liquid, including recovery of acid at low cost or high yield, recovery of iron oxide at high purity and/or high yield, and the like, for example (Patent Literatures 1 to 3).

Moreover, consideration has been given to manufacturing multiple oxides for soft ferrite by adding chloride of Mn, Mg, Ni, Zn, or the like, which are constituent metal elements of soft ferrite composition, to the iron and steel pickling waste liquid and then roasting the mixture (Patent Literatures 4 to 6).

As described above, the intended products in the course of conventional process to the iron and steel pickling waste liquid are acid, and iron oxide or soft ferrite, and there are very few examples of attempts to manufacture products other than the above materials from the pickling waste liquid.

CITATION LIST

Patent Literatures

Patent Literature 1: Japanese Patent Laid-open Publication No. 2001-172021
Patent Literature 2: Japanese Patent Laid-open Publication No. 5-33173
Patent Literature 3: Japanese Patent Laid-open Publication No. 7-3479
Patent Literature 4: Japanese Patent Laid-open Publication No. 5-175033
Patent Literature 5: Japanese Patent Laid-open Publication No. 5-170453
Patent Literature 6: Japanese Patent Laid-open Publication No. 6-293521
Patent Literature 7: Japanese Patent Laid-open Publication No. 2004-95385
Patent Literature 8: Japanese Patent Laid-open Publication No. 2004-259471

Non-Patent Literature

Non-Patent Literature 1: Tohru Murase & Naoe Hirai, "TETSU-TO-HAGANE (IRON AND STEEL)", The Iron and Steel Institute of Japan, Vol. 79, No. 101 (1993), pp. 1129-1137

SUMMARY OF INVENTION

Problem to be Solved by Invention

As described above, the iron and steel pickling waste liquid produced in the iron and steel manufacturing process has been originally treated as a waste product. As the known processing way for effective reuse, there have been only methods including recovering acid to reuse it, and including using iron oxide incidentally obtained in the process as red iron oxide without change, or using as iron oxide for ferrite raw material. Moreover, the attempts to manufacture an oxide other than iron oxide include just manufacturing of soft ferrite, and manufacturing of multiple oxides other than the iron oxide has not been even considered.

The inventors have completed the present invention based on the idea about how they could actively use the iron and steel pickling waste liquid as a raw material to manufacture products other than iron oxide and ferrite, unlike the conventional examples in which the iron and steel pickling waste liquid is processed as a waste product.

An object of the present invention is to provide a method and device for using the iron and steel pickling waste liquid to manufacture multiple oxides other than iron oxide and ferrite.

Means for Solving the Problems

Even when trying to manufacture multiple oxides other than iron oxide and ferrite by using pickling waste liquid for iron and steel, some kinds of multiple oxides are not suitable from the commercial perspective. For example, one roasting furnace with an inner diameter of about 3 meters is capable of treating pickling waste liquid of about 3000 $m^3/m$ (cubic meters per month) and produces iron oxide of about 500 t/m (tons per month) (Non-Patent Literature 1). Accordingly the demand and supply are not well-balanced unless the demand for the manufactured multiple oxides is anticipated at least to such an extent, and it is commercially difficult to continue providing such multiple oxides to the world.

Meanwhile, various environmental problems including global warming and urban warming have become obvious, and these problems are rapidly increasing the demand for lithium-ion secondary batteries in recent years. Lithium-ion secondary batteries have smaller weight and larger capacity than those of conventional lead secondary batteries or nickel-cadmium secondary batteries and are therefore widely used as power supplies for electronic devices such as mobile phones and notebook-type personal computers. Recently, they are also used as batteries of electric vehicles, plug-in hybrid vehicles, electric bicycles, and the like.

Generally used cathode materials of lithium-ion secondary batteries are multiple oxides of lithium and transition metals, such as $LiCoO_2$, $LiNiO_2$, $LiNi_{0.8}Co_{0.2}O_2$, and $LiMn_2O_4$. Moreover, multiple oxides containing iron as a constituent element has started to be used as the cathode material, and examples of the cathode material containing iron include lithium iron phosphates (for example, $LiFePO_4$) and derivatives obtained by elemental substitution or compositional change of lithium iron phosphates which is of a basic structure. Moreover, lithium iron silicates (for example, $Li_2FeSiO_4$), derivatives obtained by elemental substitution or compositional change of lithium iron silicates which is of the basic structure, lithium iron borates, and derivatives obtained by elemental substitution or compositional change of the lithium iron borates which is of the basic structure have been under consideration as the candidates for the cathode material.

Heretofore, a solid state reaction method (a solid phase method) has been generally used as the method for manufacturing the cathode material of lithium-ion secondary batteries, and also the cathode materials containing iron are manufactured using the solid phase method.

The scale of production by the solid phase method can be made comparatively large, and the solid phase method is suitable for mass production (for example, 500 t/m (tons per month)). However, there is a problem that with the solid phase method, the raw materials are difficult to be uniformly mixed, and the obtained product lacks uniformity in composition or includes an impurity phase formed therein. Moreover, the product obtained by the solid phase method is more likely to agglomerate and have large particle diameter. Furthermore, it is difficult to finely pulverize the product with the particle diameter increased.

Moreover, as a method for manufacturing the cathode material other than the solid phase method, the hydrothermal method, the spray pyrolysis method, and the like are being attempted.

For example, Patent Literature 7 describes that the hydrothermal method can provide particles having smaller diameter and better crystallinity, and can control the particle size and shape, compared with the solid phase method. With the hydrothermal method, it is therefore possible to cheaply and easily provide the cathode material for lithium ion batteries having large capacity and excellent discharge characteristics.

In Patent Literature 8, raw material solution or suspending solution atomized by ultrasonic waves or the like is introduced into a reaction furnace maintained at high temperature by carrier gas to rapidly dehydrate and simultaneously pyrolyze the atomized particles, thus producing a lithium metal phosphate compound. With the spray pyrolysis method described in Patent Literature 8, a lithium metal phosphate compound which is single-phase and has particle size easily controlled and large specific surface area is obtained. Moreover, the method of Patent Literature 8 does not require the step of pulverizing the pyrolyzed product, which is essential in the conventional solid phase method, and the manufacturing process thereof can be simplified.

However, the hydrothermal method has generally low productivity because it performs manufacturing by a batch process using a pressure-tight case. Although the hydrothermal method can be implemented by a continuous process to increase the productivity like Patent Literature 7, this requires a special pressure-tight case connected to a supply line and/or an exhaust line, and also requires a booster pump and the like to pressurize the inside of the pressure-tight case. Therefore, manufacturing cannot be always executed at low cost. Moreover, even when the hydrothermal method is performed by a continuous process to increase the productivity, the mass production on the same scale as that of the solid phase method is difficult from the perspective of scale-up of the pressure-tight case and booster pump, and manufacturing with the productivity and low cost comparable to the solid phase method is difficult to be implemented.

Moreover, the spray pyrolysis method needs to atomize the raw material solution by ultrasonic waves or the like. However, it is difficult to efficiently form a large amount of fine mist, and the mass production on the same scale as that of the solid phase method is therefore difficult.

In the light of the aforementioned circumstances, the inventors thought that if they can manufacture the cathode material of lithium-ion batteries, which material especially contains iron, by using the iron and steel pickling waste liquid, environmental burden can be reduced while the advantages of productivity and cost can be obtained. The inventors then have made studies and considerations to achieve the present invention.

The scope of the present invention is shown below.

(1) A method for manufacturing a multiple oxide, the method including:
a solution preparing step of adding a lithium compound soluble in acidic aqueous solution and an oxoanion raw-material compound to iron and steel pickling waste liquid to prepare a mixed solution;
a roasting step of introducing the mixed solution into a roasting furnace to roast the mixed solution; and
a collecting step of collecting the multiple oxide obtained in the roasting step.

(2) The method for manufacturing the multiple oxide described in the above (1), wherein an organic compound which reduces an iron ion in the iron and steel pickling waste liquid is further added in the solution preparing step.

(3) The method for manufacturing the multiple oxide described in the above (2), wherein the organic compound is 1) an organic compound which is solid at room temperature and is soluble in acidic aqueous solution, and/or 2) an organic compound which is liquid at room temperature, is soluble in acidic aqueous solution, and has a boiling point of not less than 200° C.

(4) The method for manufacturing the multiple oxide described in the above (2) or (3), wherein the organic compound is at least one kind of ethylene glycol, triethylene glycol, polyvinyl alcohol, and glucose.

(5) The method for manufacturing the multiple oxide described in any one of the above (1) to (4), further including; a pulverizing step of pulverizing the multiple oxide; and/or an annealing step of annealing the multiple oxide.

(6) The method for manufacturing the multiple oxide described in any one of the above (1) to (5), wherein the oxoanion raw-material compound is at least one kind or more of a phosphorus compound and a silicon compound.

(7) The method for manufacturing the multiple oxide described in any one of the above (1) to (6), wherein a compound of metal other than iron, which metal is soluble in acidic aqueous solution, is further added in the solution preparing step.

(8) The method for manufacturing the multiple oxide described in any one of the above (1) to (7), further including an acid recovering step of recovering acid generated in the roasting step.

(9) A multiple oxide manufacturing device, including:

a solution preparing unit which adds a lithium compound soluble in acidic aqueous solution and an oxoanion raw-material compound to iron and steel pickling waste liquid to prepare a mixed solution;

a roasting unit which roasts the mixed solution; and a collecting unit which collects the multiple oxide obtained by the roasting unit.

(10) The multiple oxide manufacturing device described in the above (9), further including: a pulverizing unit which pulverizes the multiple oxide and/or an annealing unit which anneals the multiple oxide.

(11) The multiple oxide manufacturing device described in the above (9) or (10), further including an acid recovery unit which recovers acid generated by the roasting unit.

Effect of Invention

According to the present invention, unlike the conventional processing of the iron and steel pickling waste liquid, it is possible to manufacture high value-added and effectively utilized multiple oxides with high mass productivity at low cost by using the iron and steel pickling waste liquid. The multiple oxides obtained by the present invention can be preferably used for the cathode material of lithium-ion secondary batteries. Since the raw material thereof is the iron and steel pickling waste liquid, the environmental burden concerning the manufacturing can be considerably reduced.

MODES FOR CARRYING OUT THE INVENTION

Figure 1:
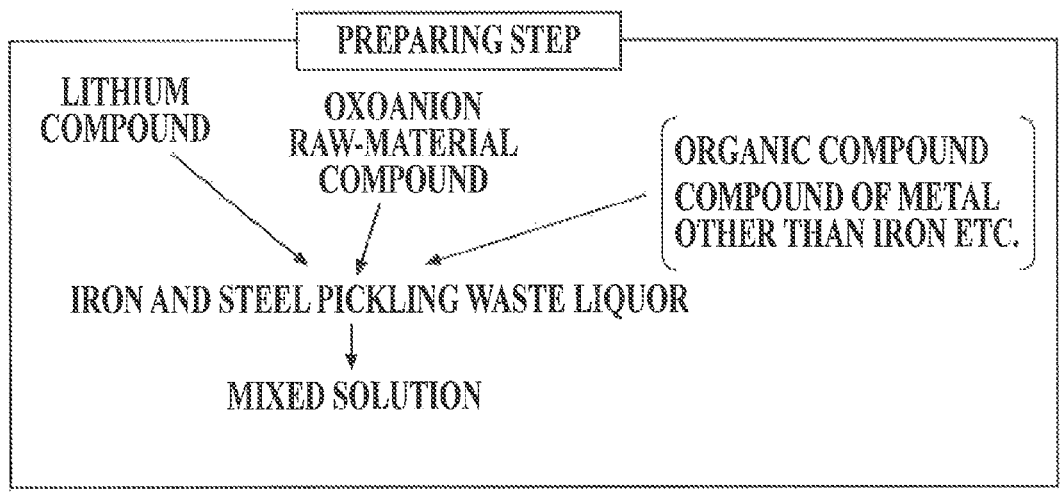
FIG. 1 is a diagram showing a preparation step according to the present invention.

A description is given of raw materials used in the present invention.

[Pickling Waste Liquid]

The iron and steel pickling waste liquid of the present invention is not limited excepting that the iron and steel pickling waste liquid is waste acid discharged through pickling process in the conventionally-known iron and steel manufacturing process, as described above. For example, the iron and steel pickling waste liquid is waste acid discharged from a bath of a pickling device in a steel pickling line, such as iron-containing waste hydrochloric acid. In the case of the iron-containing waste hydrochloric acid, as an example, the concentration of free hydrochloric acid is generally about 40 to 80 g/L (gram per liter), and the concentration of iron component (in terms of ferrous chloride $FeCl_2$) is about 70 to 150 g/L (0.55 to 1.33 mol/L (mole per liter)). The types of acid of the waste acid include nitric acid, hydrochloric acid, and sulfuric acid, and hydrochloric acid is common.

In the case that the waste acid contains impurities that could adversely affect the characteristics of the multiple oxides, it is preferable to previously remove the impurities by a proper means. The impurities can be removed by a coprecipitation process, a filtration process, or the like, for example. In this regard, however, the waste acid can be directly used if the impurities in the waste acid will not cause a problem in the characteristics of the obtained multiple oxides.

[Lithium Compound]

The lithium compound in the present invention is any lithium compound as long as the compound is soluble in neutral or acidic aqueous solution and includes a compound which reacts and forms a solution when being added to an acidic aqueous solution. Accordingly, lithium compounds which are soluble in neutral or acidic aqueous solution and are applicable to the present invention include metal lithium, lithium oxide, lithium carbonate, lithium alkoxide, lithium hydroxide, lithium nitrate, lithium chloride, and organic acid lithium (lithium acetate, lithium formate, lithium citrate, and lithium oxalate), and the like. Among the above lithium compounds, lithium nitrate, lithium chloride, and lithium carbonate are preferred in terms of cost. Herein, the lithium salts can be either hydrate or non-hydrate.

In the case of performing later-described recovery of hydrochloric acid while manufacturing a multiple oxide, the lithium compound is preferably at least one kind of lithium chloride, lithium carbonate, lithium hydroxide, lithium oxide, and metal lithium. In the case of lithium chloride, the recovered hydrochloric acid does not contain any other oxide derived from lithium compound, and in the case of lithium carbonate, lithium hydroxide, lithium oxide, and metal lithium, the iron and steel pickling waste liquid does not contain chlorine ions and does not contain any other acid.

[Oxoanion]

In the present invention, the oxoanion raw-material compound is a compound which can form oxyacid anions or oxoanions called also oxide anions, for example, compounds which can form silicate anions, borate anions, phosphate anions, tungstate anions, and the like. Examples of the oxoanion raw-material compound include boron compound, phosphorus compound, silicon compound, and tungsten compound. Preferably, the oxoanion raw-material compound is at least one kind of phosphorus compound and silicon compound, which can produce multiple oxides excellent as the cathode material.

Examples of the boron compound include boric acid, ammonium borate, and borate esters (triethyl borate, trimethyl borate, triisopropyl borate, and the like).

Examples of the phosphorus compound include phosphorus oxide, phosphoric acid, phosphate ammonium, phosphorous chloride, phosphorous oxychloride, and phosphate ester.

Examples of the silicon compound include alkoxysilane (also called silicon alkoxide or silicate ester), colloidal silica, fumed silica, silica gel, diatomite, and shirasu. Examples of the alkoxysilane include tetramethoxysilane, tetraethoxysilane, and tetrapropoxysilane. The alkxysilane also includes organoalkoxysilane, examples of which include methyltrimethoxysilane, methyltriethoxysilane, ethyltrimethoxysilane, ethyltriethoxysilane, propyltrimethoxysilane, propyltriethoxysilane, isobutyltrimethoxysilane, isobutyltriethoxysilane, dimethoxymethyl-3,3,3-trifluoropropylsilane, diisobutyldimethoxysilane, trimethylmethoxysilane, dimethoxydimethylsilane, diethoxydimethylsilane, phenyltriethoxysilane, methacryloxypropyltrimethoxysilane, methacryloxypropyltriethoxysilane, aminopropyltriethoxysilane, and aminoethylaminopropyltriethoxysilane.

Examples of the tungsten compound include tungsten oxide, tungstic acid, and ammonium tungstate.

[Organic Compound]

In the present invention, it is possible to obtain multiple oxides more preferable as the cathode material by further adding, to the aforementioned mixed solution, one kind or more selected from:
1) organic compounds which are solid at room temperature and are soluble in acidic aqueous solution (hereinafter, referred to as a solid organic compound), and
2) organic compounds which are liquid at room temperature, are soluble in acidic aqueous solution, and have a boiling point of 200 deg C. (degrees Celsius) or higher (hereinafter, referred to as a liquid organic compound) (hereinafter, the solid and liquid organic compounds are correctively referred to as a specific organic compound), though adding thereof is not essential in the present invention.

In the case where the aforementioned specific organic compound is added to the mixed solution, the specific organic compound remains in the liquid or solid state, while water evaporates to be discharged from droplets introduced into the roasting furnace. Since the remaining specific organic compound is then decomposed or carbonated to locally form a reductive atmosphere, even when the pickling waste liquid contains trivalent Fe ions, the remaining specific organic compound takes a role of reducing the trivalent Fe ions to divalent Fe ions. Accordingly, in the case of manufacturing multiple oxides (cathode material) containing divalent Fe ions, by adding the aforementioned specific organic compound, single-phase multiple oxides can be easily produced and therefore better cathode material can be obtained.

If an organic compound which is liquid at room temperature and has a boiling point of less than 200 deg C. is added, the organic compound evaporates to be discharged at the substantially same time as the water evaporates from droplets, and enough reduction operation cannot be provided. Moreover, if an organic compound which is insoluble in acid aqueous solution is added, the prepared solution to be introduced to the roasting furnace is not homogeneous, and the aforementioned reduction operation is not adequate.

In the present invention, when the liquid organic compound is added, the aforementioned reduction operation is obtained, and moreover, when the solid organic compound is added, complex multiple oxides including a complex of generated multiple oxide and carbon can be directly obtained. The complexation with carbon is effective when the multiple oxide has low electron conductivity.

In the present invention, it is particularly preferable to add both of the solid and liquid organic compounds because this allows the contained amount of carbon in the obtained complex multiple oxide (the amount of residual carbon (mass %, percent by mass)) to be easily controlled.

The additive amount of the specific organic compound is not particularly limited but needs to be in such a range that the aforementioned operational effects can be obtained, for example, is 5 to 500 g/L in the mixed solution, and preferably 20 to 200 g/L in the mixed solution. If the additive amount is less than 20 g/L, the aforementioned operation effects cannot be adequately obtained in some cases even though the carbon complex multiple compound can be obtained. If the additive amount is less than 5 g/L, the carbon complex multiple oxide itself is hardly obtained. Moreover, if the additive amount is more than 200 g/L, the large amount of organic compound increases the manufacturing cost, and if the additive amount is more than 500 g/L, the mixed solution needs to be warmed in order to ensure the solubility, thus further increasing the cost.

The specific organic compound in the present invention includes the following organic compounds.

Examples of the solid organic compounds include ascorbic acid, monosaccharide (glucose, fructose, galactose, and the like), disaccharide (sucrose, maltose, lactose, and the like), polysaccharide (amylose, cellulose, dextrin, and the like), polyvinyl alcohol, polyethylene glycol, polypropylene glycol, polyvinyl butyral, polyvinyl pyrrolidone, phenol, hydroquinone, catechol, maleic acid, citric acid, and malonic acid. The solid organic compound can be a hydrosoluble polymer other than the above-exemplified compounds. Among the solid organic compounds, compounds which have a conjugate structure (a conjugated double bond) or can easily form a conjugate structure are preferable because conductive carbon can be obtained at a high rate. Examples of the specific organic compounds including a conjugate structure include ascorbic acid, phenol having a benzene skeleton, hydroquinone, and catechol. Moreover, examples of the specific organic compounds easily forming a conjugate structure include a compound which includes an anionic group X (X=Cl, OAc, or OH) and is subjected to de-HX reaction to be conjugated with adjacent hydrogen H ($-CH_2-CHX-CH_2-CHX- \rightarrow -CH=CH-CH=CH-+2HX$), specifically, sugars such as glucose, polyvinyl alcohol, and the like.

In the present invention, it is especially preferable to use ascorbic acid, monosaccharide, disaccharide, or polyvinyl alcohol.

Examples of the organic compound which is soluble in acidic aqueous solution, has a boiling point of 200 deg C. or higher at normal pressure, and is liquid at room temperature include ethylene glycol, diethylene glycol, trimethylene glycol, diethylene glycol butylmethyl ether, triethylene glycol butylmethyl ether, tetraethylene glycol dimethyl ether, tripropylene glycol dimethyl ether, and glycerin. The particularly preferable ones are compounds having a boiling point of 260 deg C. or higher at normal pressure.

[Invention of Manufacturing Method]

The present invention relates to a method for manufacturing a multiple oxide containing iron as a constituent element, and is characterized by using the iron and steel pickling waste liquid as one of the raw materials and roasting the same. According to the present invention, it is possible to manufacture a multiple oxide suitable for the cathode material of lithium-ion secondary batteries, by adding to the iron and steel pickling waste liquid, a lithium compound and an oxoanion raw-material compound soluble in acidic aqueous solution, as raw material compounds for the constituent elements other than iron.

Figure 2:
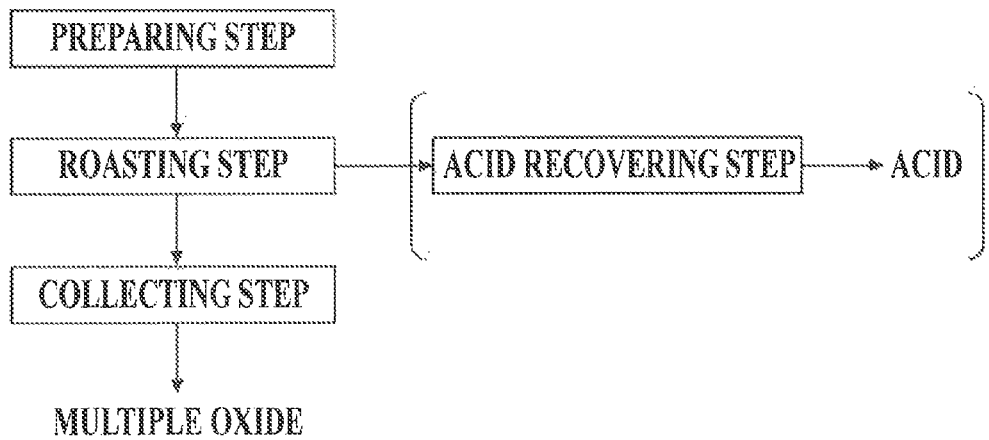
FIG. 2 is a diagram showing a manufacturing method according to the present invention.

Specifically, the method for manufacturing a multiple oxide of the present invention includes: a solution preparing step of adding the lithium compound and the oxoanion raw-material compound soluble in acidic aqueous solution to the iron and steel pickling waste liquid to prepare mixed solution (FIG. 1); a roasting step of introducing the mixed solution into a roasting furnace to roast the mixed solution; and a collecting step of collecting multiple oxide obtained in the roasting step (FIG. 2).

In the solution preparing step according to the present invention, as a method of adding the lithium compound and the oxoanion raw-material compound to the iron and steel pickling waste liquid to prepare the mixed solution, these compounds only have to be individually put into the iron and steel pickling waste liquid and left as they are. However, the compounds can be dissolved more quickly when the solution is stirred after the compounds are put therein. Moreover, these compounds are individually put into the iron and steel pickling waste liquid which is being stirred and then further continue to be stirred.

In the solution preparing step, preferably, the aforementioned specific organic compound is further added to the iron and steel pickling waste liquid.

Moreover, in the solution preparing step, preferably, a compound of metal other than iron which is soluble in acidic aqueous solution can be further added. Examples of the compound of metal other than iron are compounds of metal such as Ti, V, Cr, Mn, Co, Ni, Cu, Zn, Al, Ga, Ge, Mg, Ca, Sr, Ba, Na, K, Y, Zr, Nb, Mo, Ce, Ag, In, and Sn. Moreover, examples of the metal compound are hydroxide, nitrate, chloride, organic acid salt, oxide, carbonate, and metal alkoxide. These compounds can be properly determined depending on the purposes including an improvement of the characteristics of the intended cathode material, control of crystallization of the multiple oxide, control of grain growth, and the like.

In order to secondarily control the contained amount of iron in the iron and steel pickling waste liquid, a solution obtained by dissolving a rolling scale or iron powder in acid such as hydrochloric acid can be added to the iron and steel pickling waste liquid in the solution preparing step. Herein, the rolling scale refers to oxide in the steel material surfaces removed before or during hot rolling and include metallic iron or iron oxide of $Fe^{2+}$ or $Fe^{3+}$.

In addition, when defective products are generated in the manufacturing method of the present invention, a solution obtained by dissolving the defective products in acid such as hydrochloric acid can be added in this solution preparing step. This reduces defective products finally generated by the manufacturing method of the present invention and increases the yield ratio.

In the roasting step of the present invention, it is possible to use a roasting furnace which is used to spray and heat the iron and steel pickling waste liquid for recovery of acid from the waste liquid by publicly known processes such as Ruthner process, Lurgi process, De Lavaud process, Peace River process, Ishikawajima-Daido process, and Chemirite process. For example, in the Ruthner process, hot blast (hot blast gas) is supplied in the circumferential direction of the inside of the furnace through an inlet provided at the bottom of the furnace. The gas flow spirals, and the sprayed iron and steel pickling waste liquid is decomposed in the gas flow. Most of the products (iron oxide in the conventional examples, and multiple oxide in the present invention) falls onto the bottom of the roasting furnace and is then collected therefrom. In the Chemirite process, hot blast is jet from a hot blast generating furnace attached to the outside of a roasting furnace through a perforated plate provided in the lower part of the furnace to form a fluid bed composed of granular products (same as above) on the perforated plate. Most of the iron and steel pickling waste liquid sprayed into the upper part of the furnace is pyrolyzed in the fluid bed, and the products (same as above) are finely powdered and discharged from the top of the furnace together with pyrolysis gas.

The hot blast for heating in the roasting step can be heated nitrogen, argon, carbon dioxide, and the like, and these gases can be heated using heat exchange or a burner. A radiant tube burner or the like is particularly preferable, and use of a regenerative radiant tube burner enables efficient heating. As the hot blast, combustion gas can be used, the fuel of which can be any fuel including Liquefied Natural Gas (LNG), Liquefied Propane Gas (LPG), light oil, heavy oil, kerosene, and Coke Oven Gas (COG). In iron and steel plants, use of COG leads to more efficient manufacturing. In the case of using the combustion gas as the hot blast, control of oxidation and reductive atmospheres for the hot blast can be performed by varying the air/fuel ratio.

The roasting temperature in the roasting step, which varies depending on the multiple oxide to be produced, is for example, not less than 400 deg C. and not more than 900 deg C. and preferably 500 to 800 deg C. In the case of performing the later-described recovery of acid, the roasting temperature is preferably 600 to 800 deg C.

In the roasting step of the present invention, the method of introducing the mixed solution into the roasting furnace can be performed by jetting or spraying the mixed solution into the furnace through a nozzle or the like similarly to the aforementioned Ruthner and Chemirite processes. As an example, the nozzle for jetting/spraying the mixed solution can be a two-fluid nozzle or a four-fluid nozzle. The mixed solution can be introduced into the roasting furnace after being heated by heat exchange. Moreover, the mixed solution can be introduced into the roasting furnace after being concentrated.

In the collecting step of the present invention, the method of collecting multiple oxide includes, for example, a method using a cyclone and/or electrical dust collector, which can be combined to be used. It is possible to cool the multiple oxide through a gas cooler before collecting it by the electrical dust collector. In the case of using the roasting furnace by the Ruthner process, the multiple oxide can be collected from the roasting furnace directly to a hopper.

Furthermore, an acid recovering step of recovering acid generated in the roasting process can be further included, though the step is not essential in the present invention. With respect to the acid generated in the roasting step, processing such as neutralization itself is worth, and additionally recovering the acid in the acid recovering step enables a reuse of acid, and thereby reduces the environmental burden. The recovered acid can be reused in any manner and, for example, can be reused in pickling of iron and steel or used for dissolution of carbonate, metal, and the like in the aforementioned solution preparing step.

The method of recovering acid generated in the roasting step can be any method as long as the acid can be recovered, and, for example, can be a conventionally-known method such as a method of bringing the acid into contact with water in an acid absorption tower for recovery of the acid, or a method of letting an adsorbent or the like absorb the acid for recovery thereof.

Figure 3:
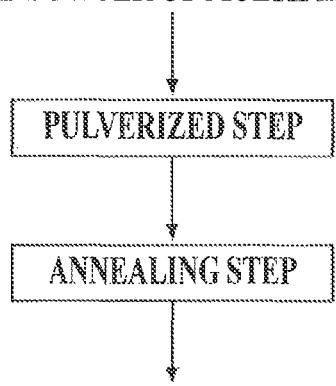
FIG. 3 is a diagram showing a manufacturing method according to the present invention.

Since the multiple oxide obtained through the aforementioned preparation, roasting, and collecting steps contain a lot of coarse powder, as aftertreatments, a pulverizing step of pulverizing powder of the collected multiple oxide and/or an annealing step of annealing the pulverized powder can be contained (FIG. 3), though they are not essential in the present invention. The pulverizing step and annealing step can provide powder of multiple oxide more suitable as the cathode material.

In the present invention, the average particle diameter of fine powder of the multiple oxide obtained by the pulverizing step is not particularly limited, but in the case of using the multiple oxide as the cathode material, for example, the finer the powder, the larger the area of contact with the electrolyte, and the shorter the in-solid diffusion distance of lithium ions. This can provide better characteristics. Accordingly, the multiple oxide is pulverized to a number average particle diameter (D50) of, preferably not more than 1.0 micrometers, more preferably not more than 0.2 micrometers, and particularly preferably not more than 0.1 micrometers.

In the pulverizing step, pulverizing can be either dry-type or wet-type. The wet-type pulverizing does not need huge equipment, and the dry-type pulverizing enables efficient pulverizing. Specific examples thereof are publicly-known devices such as a jet mill, a ball mill, a vibration mill, an attritor, and a bead mill.

Annealing in the annealing step can be performed by either a continuous process or a batch process, and can be performed using a publicly known device such as a rotary kiln, a pusher kiln, a roller hearth kiln, a tunnel kiln, a shuttle kiln, or the like.

The annealing temperature and annealing time in the annealing step are not particularly limited. Preferably, annealing is performed with a peak temperature of 500 to 900 deg C. for one (1) to ten hours and preferably for about two to five hours.

Only one of the pulverizing and annealing steps can be performed as necessary, and the order of these steps is not limited. Specifically, the order is not limited to FIG. 3, and the coarse powder of multiple oxide collected in the collecting step can be annealed before the pulverizing step is performed.

By performing the annealing step before or after the pulverizing step, the crystallinity of the multiple oxide is increased, and it is therefore possible to obtain multiple oxide having characteristics more suitable for the cathode material.

By properly combining the pulverizing conditions in the pulverizing step and the abovementioned annealing conditions to set them, the particle diameter and crystallinity of the multiple oxide can be controlled.

The finally-obtained multiple oxide preferably has a number average particle diameter (D50) of not less than 0.01 micrometers and less than 1.0 micrometers and has high crystallinity. For example, in an X-ray diffraction with a Cu target, the half value width of the highest diffraction peak is not more than 0.2 degrees.

The multiple oxide manufactured by the manufacturing method of the present invention can be suitably used as the cathode material of lithium-ion secondary batteries and contains iron ions, lithium ions, and oxoanions. Examples of the multiple oxides are lithium iron phosphate, derivatives obtained by elemental substitution or compositional change of the lithium iron phosphate which is of the basic structure, lithium iron silicate, derivatives obtained by elemental substitution or compositional change of the lithium iron silicate which is of the basic structure, lithium iron borate, and derivatives obtained by elemental substitution or compositional change of the lithium iron borate which is of the basic structure. An example of lithium iron phosphate is $LiFePO_4$, an example of lithium iron silicate is $Li_2FeSiO_4$, and an example of lithium iron borate is $LiFeBO_3$.

The element-substituted or composition-changed derivatives can be manufactured by adding the compound of metal other than iron which metal is soluble in acidic aqueous solution, or changing the additive amount of compound, in the solution preparing step as described above. As for the elemental substitution, the Li site, Fe site, and oxoanion site can be individually substituted.

[Invention of Manufacturing Device]

A manufacturing device of the present invention includes at least: a solution preparing unit which prepares the mixed solution by adding to the iron and steel pickling waste liquid, a lithium compound soluble in acidic aqueous solution, an oxoanion raw-material compound, an organic compound for reducing an iron ion(s) in the iron and steel pickling waste liquid if necessary, and a compound of metal soluble in acidic aqueous solution, the metal being other than iron, if necessary; a roasting unit roasting the mixed solution; and a collecting unit collecting multiple oxide obtained by the roasting unit.

Figure 4:
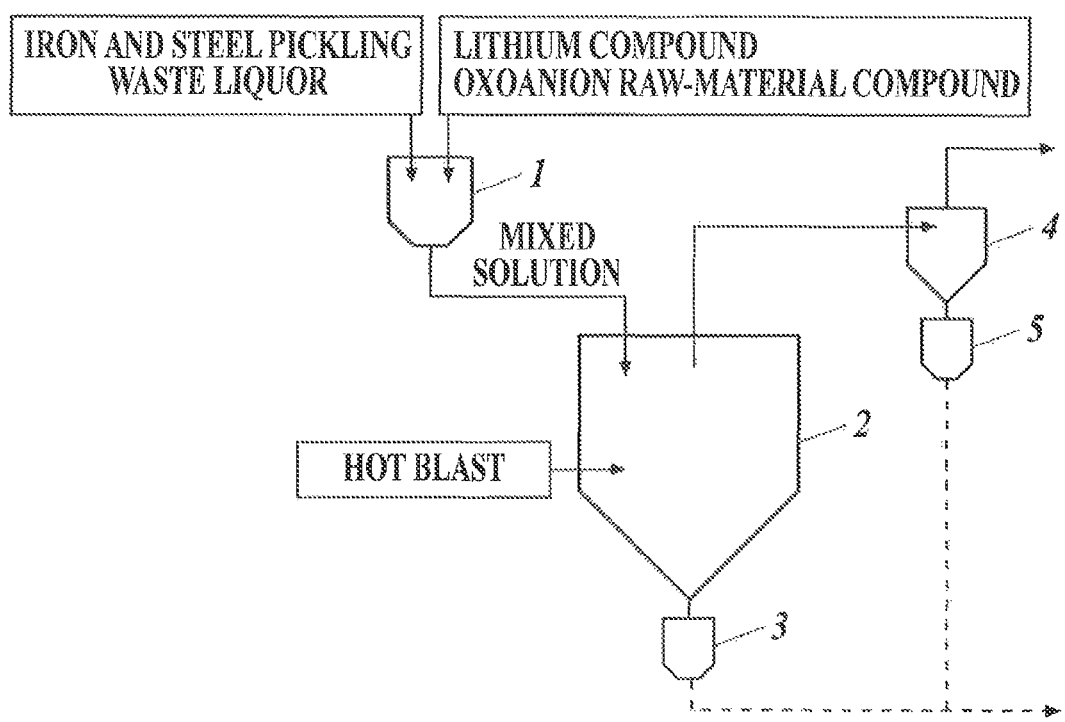
FIG. 4 is a diagram showing an example of a manufacturing device according to the present invention.

In FIG. 4, the solution preparing unit 1 adds the lithium compound and the oxoanion raw-material compound to the iron and steel pickling waste liquid to prepare mixed solution. The solution preparing unit 1 can include a not-shown agitator, and can serve as a storage tank storing the mixed solution for supplying the same to the roasting unit 2.

Furthermore, the solution preparing unit 1 can be exclusively used to prepare the mixed solution, and the mixed solution can be stored in a storage tank provided separately from the solution preparing unit 1. In this case, the mixed solution prepared in the solution preparing unit 1 is introduced through the storage tank to the roasting unit 2. Also such a configuration is included in the present invention.

In the case of using as a raw material, a compound which generates gas by being added to the iron and steel pickling waste liquid, such as carbonate, it is preferable that the solution preparing unit 1 is provided with a mechanism for releasing or recovering the gas. For the case that the temperature of the mixed solution excessively rises, it is preferable that the solution preparing unit 1 is provided with a heat removal mechanism.

As the roasting unit 2, a roasting furnace which is used to spray and heat the iron and steel pickling waste liquid for recovery of acid from the waste liquid by publicly-known processes such as the Ruthner process, Lurgi process, De Lavaud process, Peace River process, Ishikawajima-Daido process, and Chemirite process can be used. For example, in FIG. 4, a roasting furnace of the Ruthner process is used.

The mixed solution from the solution preparing unit 1 is introduced in a state of droplet into the roasting furnace of the roasting unit 2 together with hot blast, and then the droplets are heated so that multiple oxide in a powdered state is produced. Most of the obtained powder of multiple oxide is collected by a hopper 3 provided in the lower part of the roasting unit 2. On the other hand, the hot blast is let out from the upper part of the roasting unit 2, and the powder of multiple oxide contained in the hot blast is captured by a cyclone collector 4 to be collected by the hopper 5. Herein, the cyclone collector 4 can include a plurality of cyclone collectors arranged so as to be a multi-stage, or an electrical dust collector can be used instead of the cyclone collector 4. In this example, the hopper 3, cyclone collector 4, and hopper 5 constitute the collecting unit.

Figure 5:
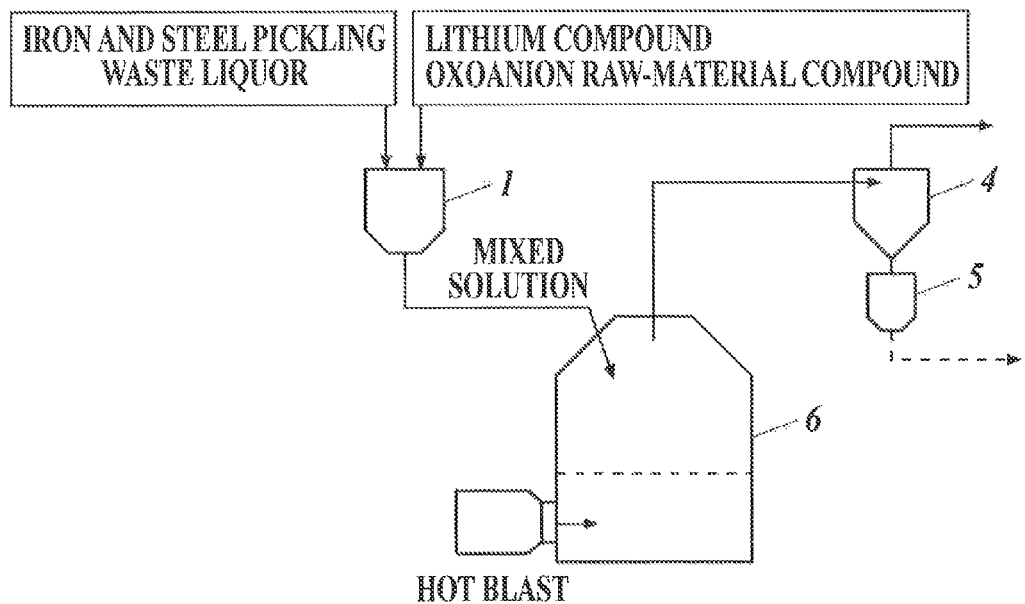
FIG. 5 is a diagram showing an example of the manufacturing device according to the present invention.

The present invention can also use a roasting furnace of the Chemirite process as shown in FIG. 5. In FIG. 5, the mixed solution prepared by the same solution preparing unit 1 as described above is introduced into a roasting furnace of a roasting unit 6 in a state of droplet and is then pyrolyzed in the liquid bed within the roasting furnace. The produced fine powder of multiple oxide is discharged through the upper part of the roasting furnace together with gas and is then collected by the same collecting unit as described above (the cyclone collector 4 and hopper 5).

Figure 6:
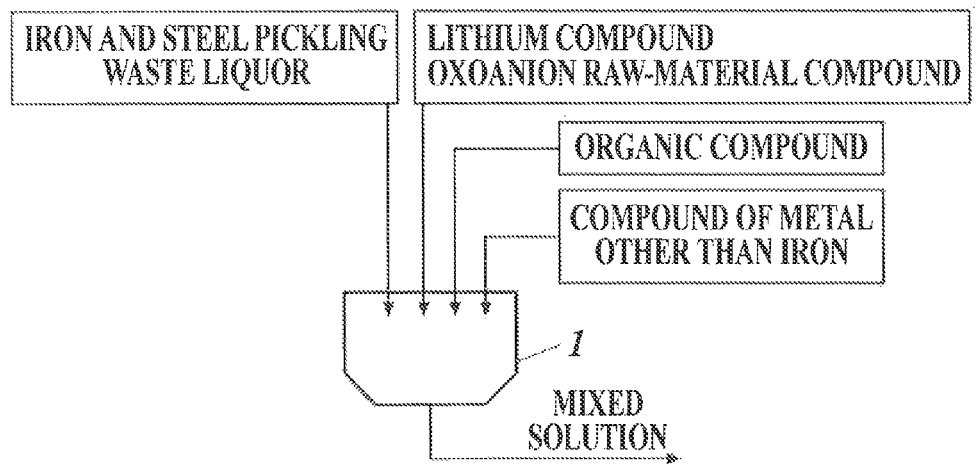
FIG. 6 is a diagram showing an example of a solution preparing unit according to the present invention.

Preferably, the solution preparing unit 1 of FIG. 4 and FIG. 5 is configured to be able to prepare the mixed solution by further adding the aforementioned specific organic compound and/or the compound of metal other than iron, which metal is soluble in acidic aqueous solution, to the iron and steel pickling waste liquid (FIG. 6).

Moreover, the present invention preferably includes a pulverizing unit to pulverize the powder of multiple oxide and an annealing unit to anneal the powder of multiple oxide. By pulverizing with the pulverizing unit, the average particle diameter of the obtained multiple oxide is reduced, so that the obtained cathode material has excellent characteristics. Moreover, by annealing with the annealing unit, the crystallinity of the obtained multiple oxide can be increased.

In the present invention, it is also possible to provide only one of the pulverizing unit and the annealing unit as the occasion demands, and the order of pulverizing and annealing is not limited.

As specific examples of the pulverizing and annealing units, the aforementioned publicly-known devices can be used.

Figure 7:
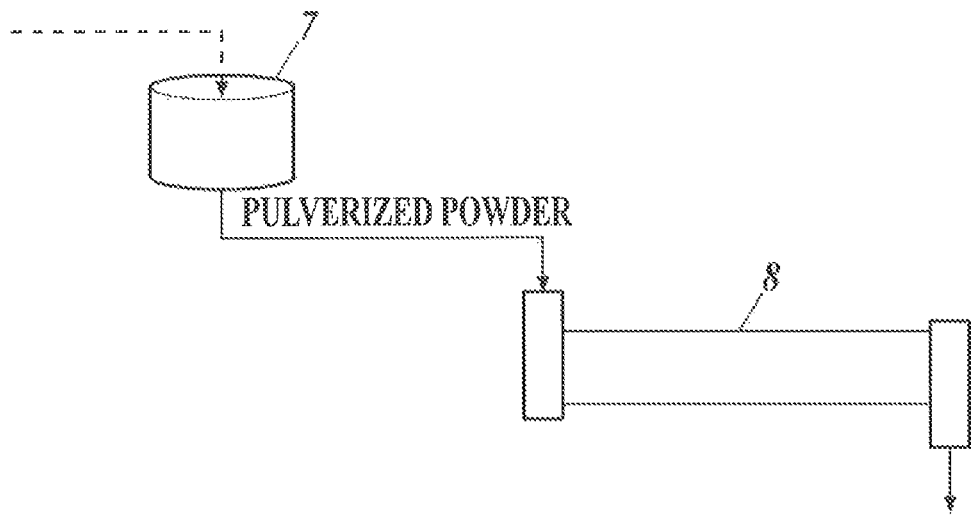
FIG. 7 is a diagram showing an example of a pulverizing unit and an annealing unit according to the present invention.
Figure 8:
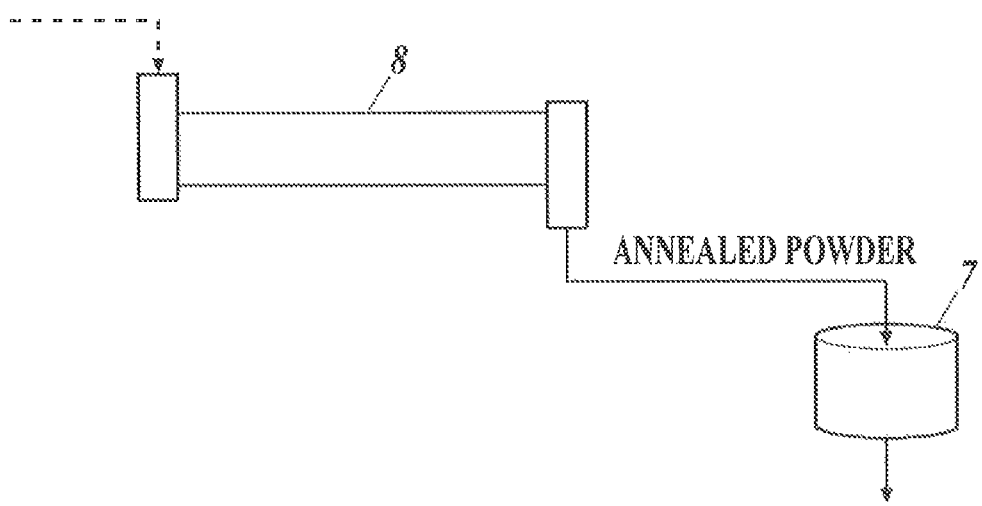
FIG. 8 is a diagram showing an example of the pulverizing and annealing units according to the present invention.

FIG. 7 shows an example of providing an annealing unit 8 which anneals the pulverized powder after the powder is collected and delivered from the collecting unit shown in FIG. 4 and FIG. 5 and is pulverized in the pulverizing unit 7. In FIG. 7, after the pulverizing unit 7 performs dry pulverizing, the annealing unit (a rotary kiln as an example) 8 performs annealing to the pulverized powder. As shown in FIG. 8, the pulverizing unit 7 can perform dry pulverizing after the annealing unit 8 performs annealing to the collected powder.

Figure 9:
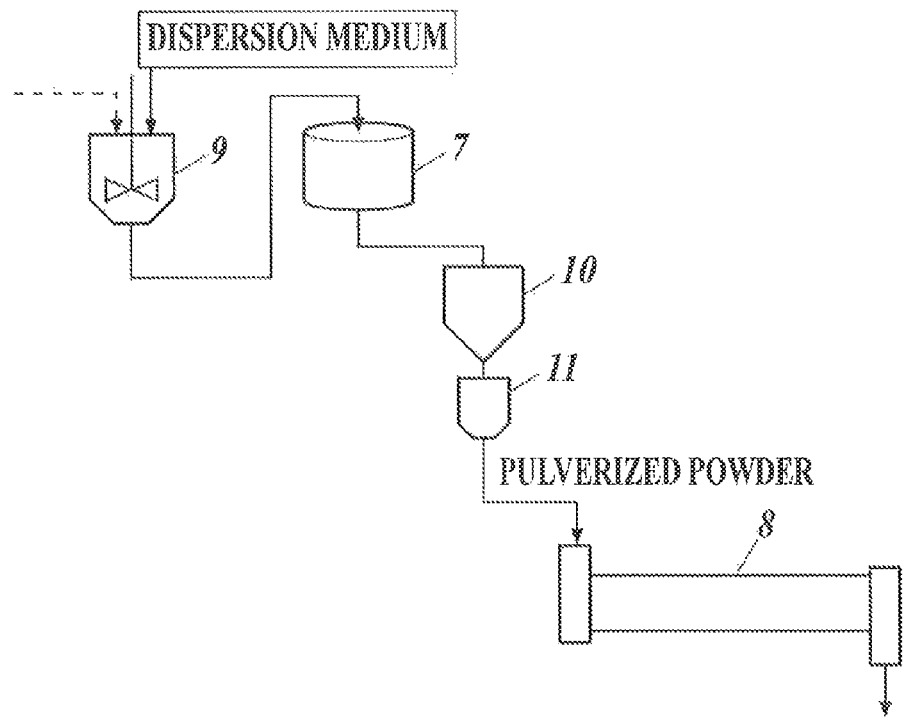
FIG. 9 is a diagram showing an example of the pulverizing and annealing units according to the present invention.
Figure 10:
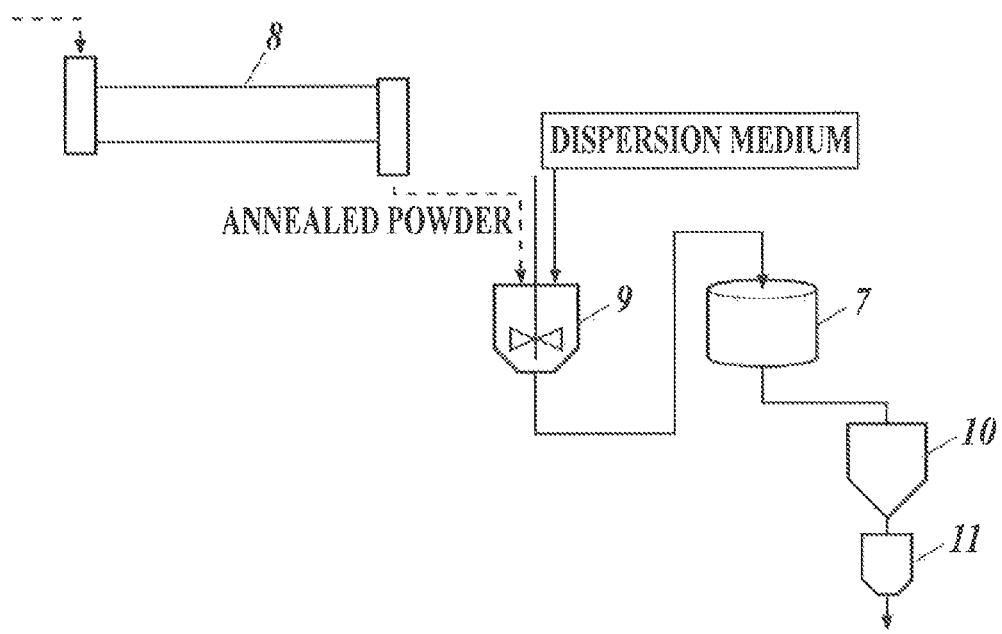
FIG. 10 is a diagram showing an example of the pulverizing and annealing units according to the present invention.

As shown in FIG. 9, pulverizing process can be wet pulverizing. The powder is mixed, in a tank 9, with a dispersion medium for wet pulverizing such as water or organic solvent to prepare slurry, which is then subjected to wet pulverizing by the pulverizing unit 7. Thereafter, a spray dryer 10 dries the wet-pulverized slurry, a hopper 11 collects the pulverized powder, and then the annealing unit (rotary kiln) 8 performs annealing. It is also possible to directly introduce the wet-pulverized slurry into the annealing unit (rotary kiln) 8, without using the spray dryer 10, to simultaneously perform drying and annealing. As shown in FIG. 10, the wet pulverizing can be performed after the annealing unit 8 performs annealing to the collected powder.

Furthermore, an acid recovery unit which recovers acid generated in the roasting unit can be provided, though such unit is not essential in the present invention.

Figure 11:
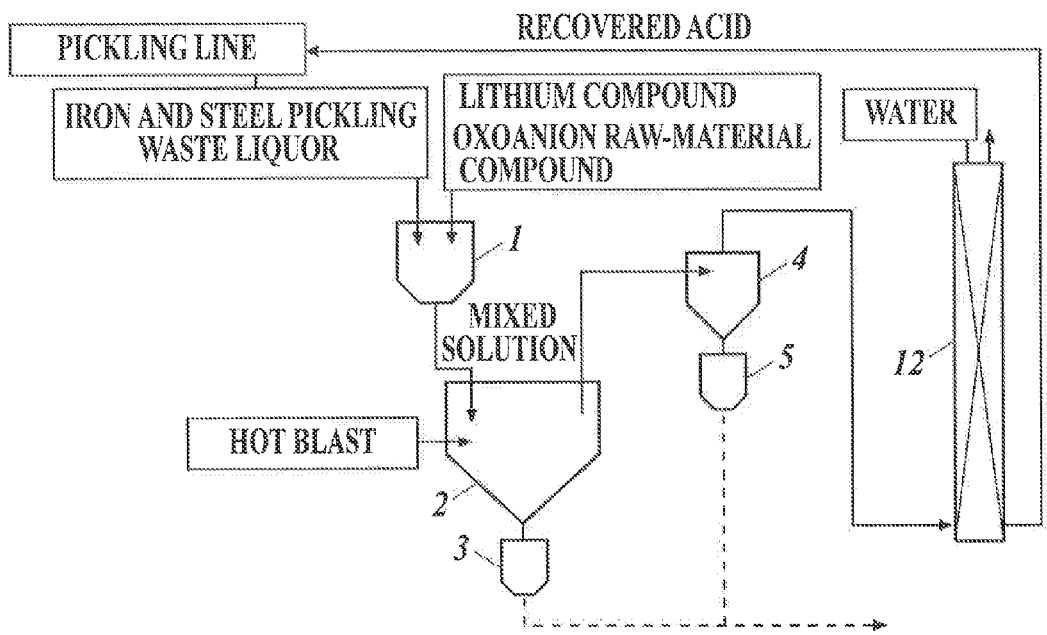
FIG. 11 is a diagram showing an example of a manufacturing device according to the present invention.
Figure 12:
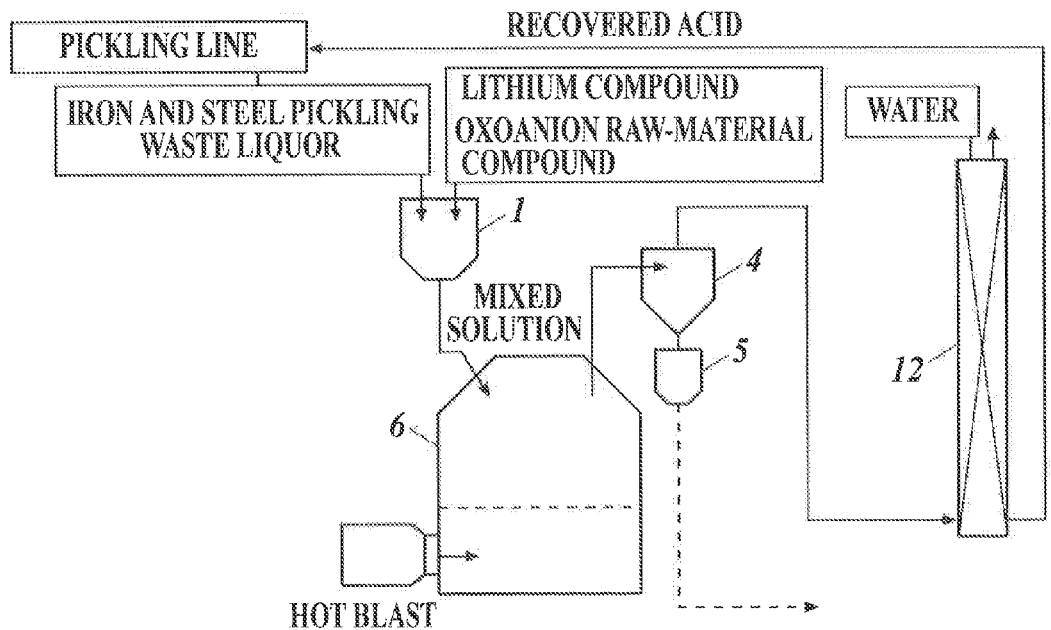
FIG. 12 is a diagram showing an example of the manufacturing device according to the present invention.

FIG. 11 and FIG. 12 show the manufacturing devices shown in FIGS. 4 and 5 additionally provided with acid recovery units 12. The gas containing acid generated in the roasting units 2, 6, is subjected to collection of the multiple oxide in the cyclone collector 4, and is then introduced into the acid recovery unit (acid recovery tower) 12. As an example, the acid recovery unit 12 recovers acid by causing water to absorb the acid in the gas. In FIG. 11 and FIG. 12, the recovered acid is properly reused in the iron and steel pickling line.

In the manufacturing device of the present invention, the aforementioned units are preferably disposed integrally or continuously in the light of the efficiency of manufacturing. However, the present invention is not limited to such a configuration, and for example, does not exclude the configuration in which some or all of the units are spatially independent of each other, for example.

EXAMPLES

Manufacturing of Samples

Example 1

By using the manufacturing device of FIG. 4, $LiFePO_4$ was manufactured as the multiple oxide. Lithium carbonate and phosphoric acid were dissolved in iron and steel pickling waste liquid containing iron ions of 0.6 mol/L so that the obtained multiple oxide had the aforementioned composition, thus preparing a mixed solution. To the prepared mixed solution, glucose as the specific organic compound was added so as to reach 60 g/L. The thus-prepared mixed solution was introduced into a roasting furnace heated by hot blast of nitrogen and was heated in the roasting furnace with the roasting temperature set to 900 deg C., thus obtaining Sample 1-1.

The composition of Sample 1-1 was analyzed by an ICP emission spectrometry (ICPS-8100 of Shimadzu Corporation), and the diffraction peak thereof was examined by an X-ray diffractometer (Ultima II of Rigaku Corporation). It was thus confirmed that the multiple oxide obtained as Sample 1-1 was $LiFePO_4$.

In Tables 1-1 to 1-4 (correctively referred to as Table 1), each column of "Impurities" shows "Not contained" when the sample contains only intended multiple oxide and shows "Contained" when the sample contains iron oxide, other impurities not identifiable, or the like.

As a result of further confirmation by an field-emission type scanning electron microscope (FE-SEM; JSM-7000F of JEOL Ltd.), in Sample 1-1, carbon was adhered to surfaces of primary particles to form a carbon complex, the primary particles having an average particle diameter of 0.02 micrometers by SEM observation, and the particles aggregated into secondary particles in a range of 3 to 30 micrometers were observed.

The contained amount (mass %) of carbon of the complex in Sample 1-1 was measured by a simultaneous carbon/sulfur analyzer (EMIA-320A of HORIBA, Ltd.), and the results thereof are described in columns of "contained amount of complex carbon".

Next, Sample 1-2 was produced as follows: part of Sample 1-1 was dry-pulverized by using a bead mill in the device of FIG. 7 into powder having D50 of 0.1 micrometers and then was annealed at 700 deg C. for three hours in nitrogen atmosphere using a rotary kiln.

In a similar manner, Sample 1-3 was produced as follows: in the device of FIG. 8, part of Sample 1-1 was wet-pulverized into powder having D50 which is equal to 0.1 micrometers by using a vibration mill and was then annealed at 700 deg C. for three hours in a nitrogen atmosphere by a rotary kiln.

Furthermore, Sample 1-4 was produced as follows: in the device of FIG. 9, part of Sample 1-1 was annealed at 700 deg C. for three hours in a nitrogen atmosphere by using a rotary kiln and was then dry-pulverized by using a bead mill into powder having D50 which is equal to 0.1 micrometers.

Furthermore, Sample 1-5 was produced as follows: in the device of FIG. 10, part of Sample 1-1 was annealed at 700 deg C. for three hours in a nitrogen atmosphere by using a rotary kiln and was then wet-pulverized into powder having D50 of 0.1 micrometers by using a vibration mill.

In a similar manner to Sample 1-1, the contained amounts of carbon of Samples 1-2 to 1-5 were measured, and the results thereof were also shown in Table 1. Herein, the number-average particle size D50 was measured by a laser diffraction/dispersion particle size distribution meter (LA-920 of HORIBA corporation).

Example 2

Samples 2-1 to 2-5 were manufactured using the manufacturing device of FIG. 5 in the same manner as in Example 1 excepting the roasting temperature set to 850 deg C. In the same manner as in Example 1, the presence and the contained amount of impurities and complex carbon were analyzed, and the results thereof are shown in Table 1. As shown in Table 1, Samples 2-1 to 2-5 contained complex carbon.

Example 3

Samples 3-1 to 3-5 were manufactured in the same manner as in Example 1 excepting that: lithium carbonate, manganese carbonate, and phosphoric acid were dissolved in such a proportion that the obtained multiple oxide be $Li(Fe_{0.1}Mn_{0.9})PO_4$; and no glucose was added. In the same manner as in Example 1, the presence and the contained amount of impurities and complex carbon were analyzed, and the results thereof are shown in Table 1. As shown in Table 1, Samples 3-1 to 3-5 did not contain any carbon.

Example 4

Samples 4-1 to 4-5 were manufactured using the manufacturing device of FIG. 5 in the same manner as in Example 3 excepting the roasting temperature set to 850 deg C. In the same manner as in Example 1, the presence and the contained amount of impurities and complex carbon were analyzed, and the results thereof are shown in Table 1. As shown in Table 1, Samples 4-1 to 4-5 did not contain any carbon.

Example 5

Samples 5-1 to 5-5 were manufactured in the same manner as in Example 1 excepting that triethylene glycol (boiling point: 284 deg C.) was added as the specific organic compound so as to reach 50 g/L and that the roasting temperature was set to 700 deg C. In the same manner as in Example 1, the presence and the contained amount of impurities and carbon composite were analyzed, and the results thereof are shown in Table 1. As shown in Table 1, Samples 5-1 to 5-5 did not contain any carbon.

Example 6

Samples 6-1 to 6-5 were manufactured using the manufacturing device of FIG. 5 in the same manner as in Example 5 excepting the roasting temperature set to 650 deg C. In the same manner as in Example 1, the presence and the contained amount of impurities and complex carbon were analyzed, and the results thereof are shown in Table 1. As shown in Table 1, Samples 6-1 to 6-5 did not contain any carbon.

Example 7

Samples 7-1 to 7-5 were manufactured in the same manner as in Example 1 excepting that 50 g/L of triethylene glycol (boiling point: 284 deg C.) was used as the specific organic compound, glucose was added thereto so as to reach 30 g/L, and the roasting temperature was set to 700 deg C. In the same manner as in Example 1, the presence and the contained amount of impurities and complex carbon were analyzed, and the results thereof are shown in Table 1. As shown in Table 1, Samples 7-1 to 7-5 contained complex carbon.

Example 8

Samples 8-1 to 8-5 were manufactured using the manufacturing device of FIG. 5 in the same manner as in Example 5 excepting the roasting temperature set to 650 deg C. In the same manner as in Example 1, the presence and the contained amount of impurities and complex carbon were analyzed, and the results thereof are shown in Table 1. As shown in Table 1, Samples 8-1 to 8-5 contained complex carbon.

Example 9

Samples 9-1 to 9-5 were manufactured in the same manner as in Example 1 excepting that ethylene glycol (boiling point: 197° C.) was added as the specific organic compound so as to reach 50 g/L. In the same manner as in Example 1, the presence and the contained amount of impurities and complex carbon were analyzed, and the results thereof are shown in Table 1. As shown in Table 1, Samples 9-1 to 9-5 did not contain any carbon.

Example 10

Samples 10-1 to 10-5 were manufactured in the same manner as in Example 6 excepting that diethylene glycol butyl methyl ether (boiling point: 212 deg C.) was added as the specific organic compound so as to reach 50 g/L. In the same manner as in Example 1, the presence and the contained amount of impurities and complex carbon; were analyzed, and the results thereof are shown in Table 1. As shown in Table 1, Samples 10-1 to 10-5 did not contain any carbon.

Example 11

Sample 11-1 was obtained in the same manner as in Sample 1-1 excepting that: lithium chloride and phosphoric acid were dissolved in the iron and steel pickling waste liquid containing 0.8 mol/L of iron ions to prepare a mixed solution; polyvinyl alcohol as the specific organic compound is added thereto so as to reach 10 g/L; and the roasting temperature was set to 800 deg C. Moreover, Samples 11-2 to 11-5 were produced in the same manner as in Samples 1-2 to 1-5 excepting that the annealing conditions were set to 650 deg C. for five hours. In the same manner as in Example 1, the presence and the contained amount of impurities and complex carbon were analyzed, and the results thereof are shown in Table 1. As shown in Table 1, Samples 11-1 to 11-5 contained complex carbon.

Example 12

Samples 12-1 to 12-5 were produced in the same manner as in Example 11 excepting that lithium carbonate, manganese carbonate, and colloidal silica were dissolved in such a proportion that the obtained multiple oxide be $Li_2(Fe_{0.5}Mn_{0.5})SiO_4$ to prepare a mixed solution; and glucose as the specific organic compound was added thereto so as to reach 50 g/L. In the same manner as in Example 1, the presence and the contained amount of impurities and complex carbon were analyzed, and the results thereof are shown in Table 1. As shown in Table 1, Samples 12-1 to 12-5 contained complex carbon.

Example 13

Samples 13-1 to 13-5 were produced in the same manner as in Example 11 excepting that: lithium carbonate and boric acid were dissolved in the iron and steel pickling waste liquid containing 0.5 mol/L of iron ions in such a proportion that the obtained multiple oxide be $LiFeBO_4$; and glucose was added thereto so as to reach 60 g/L. In the same manner as in Example 1, the presence and the contained amount of impurities and complex carbon were analyzed, and the results thereof are shown in Table 1. As shown in Table 1, Samples 13-1 to 13-5 contained complex carbon.

Example 14

Samples 14-1 to 14-5 were produced in the same way as in Example 12 excepting that lithium carbonate, manganese carbonate, phosphoric acid, and colloidal silica were used in such a proportion that the obtained multiple oxide was $Li_{1.1}(Fe_{0.5}Mn_{0.5})[(PO_4)_{0.9}(SiO_4)_{0.1}]$. In the same manner as in Example 1, the presence and the contained amount of impurities and complex carbon were analyzed, and the results thereof are shown in Table 1. As shown in Table 1, Samples 14-1 to 14-5 contained complex carbon.

Example 15

Sample 15-1 was produced in the same manner as Sample 1-1 excepting use of the manufacturing device of FIG. 11, and acid was recovered. It was found that the recovered acid could be reused in the iron and steel pickling line.

Next, Sample 15-2 was produced as follows: part of Sample 15-1 was subjected to only annealing at 700 deg C. for three hours in a nitrogen atmosphere by a rotary kiln while being not subjected to pulverizing in the device of FIG. 8. In the same manner, part of Sample 15-1 was subjected to only wet-pulverizing by a vibration mill while not performing annealing in the device of FIG. 8 to produce Sample 15-3 having D50 which is equal to 0.1 micrometers. In the same manner as in Example 1, the presence and the contained amount of impurities and complex carbon were analyzed, and the results thereof are shown in Table 1. As shown in Table 1, Samples 15-1 to 15-3 contained complex carbon.

Example 16

Sample 16-1 was produced in the same manner as Sample 1-1 excepting that lithium nitrate was used as the lithium compound. In the same manner as in Example 1, the presence and the contained amount of impurities and complex carbon were analyzed, and the results thereof are shown in Table 1. As shown in Table 1, Sample 16-1 contained complex carbon.

Example 17

Sample 17-1 was produced in the same manner as Sample 1-1 excepting that diammonium hydrogen phosphate was used as the oxoanion raw-material compound. In the same manner as in Example 1, the presence and the contained amount of impurities and complex carbon were analyzed, and the results thereof are shown in Table 1. As shown in Table 1, Sample 17-1 contained complex carbon.

Example 18

Sample 18-1 was produced in the same manner as Sample 12-1 excepting that: lithium nitrate, manganese nitrate, and tetraethoxysilane were dissolved in the iron and steel pickling waste liquid containing 0.6 mol/L of iron ions to prepare a mixed solution; and ethylene glycol as the specific organic compound was added so as to reach 50 g/L.

In the same manner as in Example 1, the presence and the contained amount of impurities and complex carbon were analyzed, and the results thereof are shown in Table 1. As shown in Table 1, Sample 18-1 contained complex carbon.

Example 19

Sample 19-1 was produced in the similar manner as Sample 18-1 excepting that lithium chloride was used as the lithium compound. In the same manner as in Example 1, the presence and the contained amount of impurities and complex carbon were analyzed, and the results thereof are shown in Table 1. As shown in Table 1, Sample 19-1 contained complex carbon.

Comparative Example 1

$LiFePO_4$ was produced as multiple oxide by a solid phase method.

Lithium carbonate, iron (II) oxalate dihydrate, and diammonium hydrogen phosphate were mixed in such a proportion that the obtained multiple oxide be $LiFePO_4$, and the mixture was baked at 650 deg C. for 10 hours in argon stream. The obtained sample was pulverized by a bead mill so that D50 is equal to 0.1 micrometers, thus producing Comparative Sample 1. In the same manner as in Example 1, the presence and the contained amount of impurities and complex carbon were analyzed, and the results thereof are shown in Table 1. As shown in Table 1, Comparative Sample 1 did not contain any carbon.

Comparative Example 2

$Li_2(Fe_{0.5}Mn_{0.5})SiO_4$ was produced as the multiple oxide by a solid phase method.

Lithium carbonate, manganese (II) oxalate dehydrate, iron (II) oxalate dihydrate, and silicon dioxide were mixed in such a proportion that the obtained multiple oxide be $Li_2(Fe_{0.5}Mn_{0.5})SiO_4$, and the mixture was baked at 650 deg C. for 10 hours in argon stream. The obtained sample was pulverized by a bead mill so that D50 is equal to 0.1 micrometers, thus producing Comparative Sample 2. In the same manner as in Example 1, the presence and the contained amount of impurities and complex carbon were analyzed, and the results thereof are shown in Table 1. As shown in Table 1, Comparative Sample 1 did not contain any carbon.

Comparative Example 3

$LiFeBO_4$ was produced as the multiple oxide by a solid phase method.

Lithium carbonate, iron (II) oxalate dihydrate, and boric acid were mixed in such a proportion that the obtained multiple oxide be $LiFeBO_4$, and the mixture was baked at 650 deg C. for 10 hours in argon stream. The obtained sample was pulverized by a bead mill so that D50 is equal to 0.1 micrometers, thus producing Comparative Sample 3. In the same manner as in Example 1, the presence and the contained amount of impurities and complex carbon were analyzed, and the results thereof are shown in Table 1. As shown in Table 1, Comparative Sample 1 did not contain any carbon.

[Characteristic Evaluation of Multiple Oxide]

The samples of Table 1 not containing complex carbon were subjected to carbon coating in the following manner. At first, the amount of glucose was determined so that the residual carbon amount is 5.0 mass %, and the determined amount of glucose was ultrasonically mixed together with each sample (multiple oxide) in a water-ethanol solvent. The mixture was dried and heat-treated at 600 deg C. for two hours in argon stream, and then the abovementioned carbon analysis was performed to confirm that the carbon of the sample after the heat treatment has become 5.0 mass %.

Lithium-ion secondary batteries were evaluated in terms of discharge capacity in the following procedure, which batteries use the carbon-coated samples obtained in the aforementioned manner and carbon composite samples (the complex carbon amount was not zero (0)) shown in Table 1 as the cathode materials.

Sample batteries were produced, which included: the produced multiple oxides and metal lithium respectively used as the cathode and anode (negative electrode); and non-aqueous electrolyte solution.

The cathode was produced by mixing the powder of carbon complex multiple oxide, acetylene black powder, and polytetrafluoroethylene powder in weight ratio of 75/20/5, kneading the mixture in a mortar, and pressure-bonding the kneaded product to aluminum mesh. The anode was produced by using metal lithium foil, and the anode current collector was produced by using nickel foil of 20 micrometers. Non-aqueous electrolyte solution obtained by dissolving 1.0 mol/L of $LiPF_6$ in a solvent mixture of ethyl carbonate and dimethyl carbonate in a volume ratio of 1/2 was used as the electrolyte solution, and porous polypropylene having a thickness of 25 micrometers was used for the separator to assemble CR2032-type coin cells in an argon glovebox.

Five coin cells were produced for each sample, which cells were subjected to a charge-discharge test in a constant temperature bath at 25 deg C. and the initial capacities thereof were measured. In the charge-discharge test, in a voltage range of 2.5 to 4.2 V or 2.5 to 5.0 V, preliminary CV measurement was performed at 1.0 C and then the CC-CV measurement was performed at 0.1 C to measure the initial capacity. The discharge capacity was defined as an average of initial capacities of three cells other than the maximum and minimum initial capacities among the five cells.

Table 1 shows the results of evaluation of the produced multiple oxide. As for the discharge capacity, "A" indicates that the measured discharge capacity was not less than 95% of the ideal capacity; "B", not less than 90% and less than 95%; "C", not less than 80% and less than 90%; "D", not less than 70% and less than 80%; "E", not less than 50% and less than 70%; "F", less than 50%.

TABLE 1

| EXAMPLES | | MULTIPLE OXIDE | ROASTING TYPE | ROASTING TEMPERATURE (DEG C.) | RAW MATERIALS |
|---|---|---|---|---|---|
| 1 | SAMPLE 1-1<br>SAMPLE 1-2<br>SAMPLE 1-3<br>SAMPLE 1-4<br>SAMPLE 1-5 | $LiFePO_4$ | RUTHNER | 900 | PICKLING WASTE LIQUID<br>LITHIUM CARBONATE<br>PHOSPHORIC ACID<br>GLUCOSE |
| 2 | SAMPLE 2-1<br>SAMPLE 2-2<br>SAMPLE 2-3<br>SAMPLE 2-4<br>SAMPLE 2-5 | $LiFePO_4$ | CHEMIRITE | 850 | PICKLING WASTE LIQUID<br>LITHIUM CARBONATE<br>PHOSPHORIC ACID<br>GLUCOSE |
| 3 | SAMPLE 3-1<br>SAMPLE 3-2<br>SAMPLE 3-3<br>SAMPLE 3-4<br>SAMPLE 3-5 | $Li(Fe_{0.1}Mn_{0.9})PO_4$ | RUTHNER | 900 | PICKLING WASTE LIQUID<br>LITHIUM CARBONATE<br>PHOSPHORIC ACID<br>MANGANESE CARBONATE |
| 4 | SAMPLE 4-1<br>SAMPLE 4-2<br>SAMPLE 4-3<br>SAMPLE 4-4<br>SAMPLE 4-5 | $Li(Fe_{0.1}Mn_{0.9})PO_4$ | CHEMIRITE | 850 | PICKLING WASTE LIQUID<br>LITHIUM CARBONATE<br>PHOSPHORIC ACID<br>MANGANESE CARBONATE |
| 5 | SAMPLE 5-1<br>SAMPLE 5-2<br>SAMPLE 5-3<br>SAMPLE 5-4<br>SAMPLE 5-5 | $LiFePO_4$ | RUTHNER | 700 | PICKLING WASTE LIQUID<br>LITHIUM CARBONATE<br>PHOSPHORIC ACID<br>TRIETHYLENE GLYCOL |
| 6 | SAMPLE 6-1<br>SAMPLE 6-2<br>SAMPLE 6-3<br>SAMPLE 6-4<br>SAMPLE 6-5 | $LiFePO_4$ | CHEMIRITE | 60 | PICKLING WASTE LIQUID<br>LITHIUM CARBONATE<br>PHOSPHORIC ACID<br>TRIETHYLENE GLYCOL |
| 7 | SAMPLE 7-1<br>SAMPLE 7-2<br>SAMPLE 7-3<br>SAMPLE 7-4<br>SAMPLE 7-5 | $LiFePO_4$ | RUTHNER | 700 | PICKLING WASTE LIQUID<br>LITHIUM CARBONATE<br>PHOSPHORIC ACID<br>TRIETHYLENE GLYCOL<br>GLUCOSE |
| 8 | SAMPLE 8-1<br>SAMPLE 8-2<br>SAMPLE 8-3<br>SAMPLE 8-4<br>SAMPLE 8-5 | $LiFePO_4$ | CHEMIRITE | 650 | PICKLING WASTE LIQUID<br>LITHIUM CARBONATE<br>PHOSPHORIC ACID<br>TRIETHYLENE GLYCOL<br>GLUCOSE |
| 9 | SAMPLE 9-1<br>SAMPLE 9-2<br>SAMPLE 9-3<br>SAMPLE 9-4<br>SAMPLE 9-5 | $Li(Fe_{0.1}Mn_{0.9})PO_4$ | RUTHNER | 900 | PICKLING WASTE LIQUID<br>LITHIUM CARBONATE<br>PHOSPHORIC ACID<br>MANGANESE CARBONATE<br>ETHYLENE GLYCOL |
| 10 | SAMPLE 10-1<br>SAMPLE 10-2<br>SAMPLE 10-3<br>SAMPLE 10-4<br>SAMPLE 10-5 | $LiFePO_4$ | CHEMIRITE | 650 | PICKLING WASTE LIQUID<br>LITHIUM CARBONATE<br>PHOSPHORIC ACID<br>DIETHYLENE GLYCOL<br>BUTYL METHYL |

TABLE 1-continued

| | | | | | |
|---|---|---|---|---|---|
| 11 | SAMPLE 11-1<br>SAMPLE 11-2<br>SAMPLE 11-3<br>SAMPLE 11-4<br>SAMPLE 11-5 | $LiFePO_4$ | RUTHNER | 800 | ETHER<br>PICKLING WASTE LIQUID<br>LITHIUM CHLORIDE<br>PHOSPHORIC ACID<br>POLYVINYL ALCOHOL |
| 12 | SAMPLE 12-1<br>SAMPLE 12-2<br>SAMPLE 12-3<br>SAMPLE 12-4<br>SAMPLE 12-5 | $Li_2(Fe_{0.5}Mn_{0.5})SiO_4$ | RUTHNER | 800 | PICKLING WASTE LIQUID<br>LITHIUM CARBONATE<br>MANGANESE CARBONATE<br>COLLOIDAL SILICA<br>GLUCOSE |
| 13 | SAMPLE 13-1<br>SAMPLE 13-2<br>SAMPLE 13-3<br>SAMPLE 13-4<br>SAMPLE 13-5 | $LiFeBO_4$ | RUTHNER | 800 | PICKLING WASTE LIQUID<br>LITHIUM CARBONATE<br>BORIC ACID<br>GLUCOSE |
| 14 | SAMPLE 14-1<br>SAMPLE 14-2<br>SAMPLE 14-3<br>SAMPLE 14-4<br>SAMPLE 14-5 | $Li_{1.1}(Fe_{0.5}Mn_{0.5})[(PO_4)_{0.9}(SiO_4)_{0.1}]$ | RUTHNER | 800 | PICKLING WASTE LIQUID<br>LITHIUM CARBONATE<br>PHOSPHORIC ACID<br>MANGANESE CARBONATE<br>COLLOIDAL SILICA<br>GLUCOSE |
| 15 | SAMPLE 15-1<br>SAMPLE 15-2<br>SAMPLE 15-3 | $LiFePO_4$ | RUTHNER | 900 | PICKLING WASTE LIQUID<br>LITHIUM CARBONATE<br>PHOSPHORIC ACID<br>GLUCOSE |
| 16 | SAMPLE 16-1 | $LiFePO_4$ | RUTHNER | 900 | PICKLING WASTE LIQUID<br>LITHIUM NITRATE<br>PHOSPHORIC ACID<br>GLUCOSE |
| 17 | SAMPLE 17-1 | $LiFePO_4$ | RUTHNER | 900 | PICKLING WASTE LIQUID<br>LITHIUM CARBONATE<br>DIAMMONIUM HYDROGEN PHOSPHATE<br>GLUCOSE |
| 18 | SAMPLE 18-1 | $Li_2(Fe_{0.5}Mn_{0.5})SiO_4$ | RUTHNER | 800 | PICKLING WASTE LIQUID<br>LITHIUM NITRATE<br>MANGANESE NITRATE<br>TETRAETHOXYSILANE<br>ETHYLENE GLYCOL |
| 19 | SAMPLE 19-1 | $Li_2(Fe_{0.5}Mn_{0.5})SiO_4$ | RUTHNER | 800 | PICKLING WASTE LIQUID<br>LITHIUM CHLORIDE<br>MANGANESE NITRATE<br>TETRAETHOXYSILANE<br>ETHYLENE GLYCOL |
| COMPARATIVE EXAMPLES | COMPARATIVE SAMPLE 1 | $LiFePO_4$ | (SOLID PHASE METHOD) | | LITHIUM CARBONATE<br>IRON (II) OXALATE DIHYDRATE<br>DIAMMONIUM HYDROGEN PHOSPHATE |
| | COMPARATIVE SAMPLE 2 | $Li_2(Fe_{0.5}Mn_{0.5})SiO_4$ | (SOLID PHASE METHOD) | | LITHIUM CARBONATE<br>MANGANESE (II) OXALATE DIHYDRATE<br>SILICON DIOXIDE |
| | COMPARATIVE SAMPLE 3 | $LiFeBO_4$ | (SOLID PHASE METHOD) | | LITHIUM CARBONATE<br>IRON (II) OXALATE DIHYDRATE<br>BORIC ACID |

| | | AFTER TREATMENTS | | | AMOUNT OF COMPLEX CARBON (MASS %) | DISCHARGE CAPACITY CHARACTERISTICS |
|---|---|---|---|---|---|---|
| EXAMPLES | | GRINDING | ANNEALING (DEG C.) × (HOURS) | ORDER | IMPURITIES | | |
| 1 | SAMPLE 1-1 | — | — | — | NOT CONTAINED | 8.1 | C |
| | SAMPLE 1-2 | DRY | 700 × 3 | GRINDING→ANNEALING | NOT CONTAINED | 8.0 | A |
| | SAMPLE 1-3 | WET | 700 × 3 | GRINDING→ANNEALING | NOT CONTAINED | 8.0 | A |
| | SAMPLE 1-4 | DRY | 700 × 3 | ANNEALING→GRINDING | NOT CONTAINED | 8.0 | B |
| | SAMPLE 1-5 | WET | 700 × 3 | ANNEALING→GRINDING | NOT CONTAINED | 8.0 | B |
| 2 | SAMPLE 2-1 | — | — | — | NOT CONTAINED | 7.8 | C |
| | SAMPLE 2-2 | DRY | 700 × 3 | GRINDING→ANNEALING | NOT CONTAINED | 7.7 | A |
| | SAMPLE 2-3 | WET | 700 × 3 | GRINDING→ANNEALING | NOT CONTAINED | 7.7 | A |
| | SAMPLE 2-4 | DRY | 700 × 3 | ANNEALING→GRINDING | NOT CONTAINED | 7.7 | B |
| | SAMPLE 2-5 | WET | 700 × 3 | ANNEALING→GRINDING | NOT CONTAINED | 7.7 | B |
| 3 | SAMPLE 3-1 | — | — | — | CONTAINED | 0 | D |
| | SAMPLE 3-2 | DRY | 700 × 3 | GRINDING→ANNEALING | NOT CONTAINED | 0 | C |
| | SAMPLE 3-3 | WET | 700 × 3 | GRINDING→ANNEALING | NOT CONTAINED | 0 | C |
| | SAMPLE 3-4 | DRY | 700 × 3 | ANNEALING→GRINDING | NOT CONTAINED | 0 | C |
| | SAMPLE 3-5 | WET | 700 × 3 | ANNEALING→GRINDING | NOT CONTAINED | 0 | C |
| 4 | SAMPLE 4-1 | — | — | — | CONTAINED | 0 | D |
| | SAMPLE 4-2 | DRY | 700 × 3 | GRINDING→ANNEALING | NOT CONTAINED | 0 | C |
| | SAMPLE 4-3 | WET | 700 × 3 | GRINDING→ANNEALING | NOT CONTAINED | 0 | C |
| | SAMPLE 4-4 | DRY | 700 × 3 | ANNEALING→GRINDING | NOT CONTAINED | 0 | C |

TABLE 1-continued

| | Sample | Wet/Dry | Temp | Process | Contained | Value | Grade |
|---|---|---|---|---|---|---|---|
| | SAMPLE 4-5 | WET | 700 × 3 | ANNEALING→GRINDING | NOT CONTAINED | 0 | C |
| 5 | SAMPLE 5-1 | — | — | — | NOT CONTAINED | 0 | C |
| | SAMPLE 5-2 | DRY | 700 × 3 | GRINDING→ANNEALING | NOT CONTAINED | 0 | B |
| | SAMPLE 5-3 | WET | 700 × 3 | GRINDING→ANNEALING | NOT CONTAINED | 0 | B |
| | SAMPLE 5-4 | DRY | 700 × 3 | ANNEALING→GRINDING | NOT CONTAINED | 0 | B |
| | SAMPLE 5-5 | WET | 700 × 3 | ANNEALING→GRINDING | NOT CONTAINED | 0 | B |
| 6 | SAMPLE 6-1 | — | — | — | NOT CONTAINED | 0 | C |
| | SAMPLE 6-2 | DRY | 700 × 3 | GRINDING→ANNEALING | NOT CONTAINED | 0 | B |
| | SAMPLE 6-3 | WET | 700 × 3 | GRINDING→ANNEALING | NOT CONTAINED | 0 | B |
| | SAMPLE 6-4 | DRY | 700 × 3 | ANNEALING→GRINDING | NOT CONTAINED | 0 | B |
| | SAMPLE 6-5 | WET | 700 × 3 | ANNEALING→GRINDING | NOT CONTAINED | 0 | B |
| 7 | SAMPLE 7-1 | — | — | — | NOT CONTAINED | 4.1 | C |
| | SAMPLE 7-2 | DRY | 700 × 3 | GRINDING→ANNEALING | NOT CONTAINED | 4.0 | A |
| | SAMPLE 7-3 | WET | 700 × 3 | GRINDING→ANNEALING | NOT CONTAINED | 4.0 | A |
| | SAMPLE 7-4 | DRY | 700 × 3 | ANNEALING→GRINDING | NOT CONTAINED | 4.0 | B |
| | SAMPLE 7-5 | WET | 700 × 3 | ANNEALING→GRINDING | NOT CONTAINED | 4.0 | B |
| 8 | SAMPLE 8-1 | — | — | — | NOT CONTAINED | 3.9 | C |
| | SAMPLE 8-2 | DRY | 700 × 3 | GRINDING→ANNEALING | NOT CONTAINED | 3.8 | A |
| | SAMPLE 8-3 | WET | 700 × 3 | GRINDING→ANNEALING | NOT CONTAINED | 3.8 | A |
| | SAMPLE 8-4 | DRY | 700 × 3 | ANNEALING→GRINDING | NOT CONTAINED | 3.8 | B |
| | SAMPLE 8-5 | WET | 700 × 3 | ANNEALING→GRINDING | NOT CONTAINED | 3.8 | B |
| 9 | SAMPLE 9-1 | — | — | — | CONTAINED | 0 | D |
| | SAMPLE 9-2 | DRY | 700 × 3 | GRINDING→ANNEALING | NOT CONTAINED | 0 | C |
| | SAMPLE 9-3 | WET | 700 × 3 | GRINDING→ANNEALING | NOT CONTAINED | 0 | C |
| | SAMPLE 9-4 | DRY | 700 × 3 | ANNEALING→GRINDING | NOT CONTAINED | 0 | C |
| | SAMPLE 9-5 | WET | 700 × 3 | ANNEALING→GRINDING | NOT CONTAINED | 0 | C |
| 10 | SAMPLE 10-1 | — | — | — | NOT CONTAINED | 0 | C |
| | SAMPLE 10-2 | DRY | 700 × 3 | GRINDING→ANNEALING | NOT CONTAINED | 0 | B |
| | SAMPLE 10-3 | WET | 700 × 3 | GRINDING→ANNEALING | NOT CONTAINED | 0 | B |
| | SAMPLE 10-4 | DRY | 700 × 3 | ANNEALING→GRINDING | NOT CONTAINED | 0 | B |
| | SAMPLE 10-5 | WT | 700 × 3 | ANNEALING→GRINDING | NOT CONTAINED | 0 | B |
| 11 | SAMPLE 11-1 | — | — | — | NOT CONTAINED | 4.5 | C |
| | SAMPLE 11-2 | DRY | 650 × 5 | GRINDING→ANNEALING | NOT CONTAINED | 4.4 | A |
| | SAMPLE 11-3 | WET | 650 × 5 | GRINDING→ANNEALING | NOT CONTAINED | 4.4 | A |
| | SAMPLE 11-4 | DRY | 650 × 5 | ANNEALING→GRINDING | NOT CONTAINED | 4.4 | B |
| | SAMPLE 11-5 | WET | 650 × 5 | ANNEALING→GRINDING | NOT CONTAINED | 4.4 | B |
| 12 | SAMPLE 12-1 | — | — | — | NOT CONTAINED | 8.5 | D |
| | SAMPLE 12-2 | DRY | 650 × 5 | GRINDING→ANNEALING | NOT CONTAINED | 8.4 | C |
| | SAMPLE 12-3 | WET | 650 × 5 | GRINDING→ANNEALING | NOT CONTAINED | 8.4 | C |
| | SAMPLE 12-4 | DRY | 650 × 5 | ANNEALING→GRINDING | NOT CONTAINED | 8.4 | C |
| | SAMPLE 12-5 | WET | 650 × 5 | ANNEALING→GRINDING | NOT CONTAINED | 8.4 | C |
| 13 | SAMPLE 13-1 | — | — | — | NOT CONTAINED | 6.3 | D |
| | SAMPLE 13-2 | DRY | 650 × 5 | GRINDING→ANNEALING | NOT CONTAINED | 6.1 | C |
| | SAMPLE 13-3 | WET | 650 × 5 | GRINDING→ANNEALING | NOT CONTAINED | 6.1 | C |
| | SAMPLE 13-4 | DRY | 650 × 5 | ANNEALING→GRINDING | NOT CONTAINED | 6.1 | C |
| | SAMPLE 13-5 | WET | 650 × 5 | ANNEALING→GRINDING | NOT CONTAINED | 6.1 | C |
| 14 | SAMPLE 14-1 | — | — | — | NOT CONTAINED | 6.6 | C |
| | SAMPLE 14-2 | DRY | 650 × 5 | GRINDING→ANNEALING | NOT CONTAINED | 6.5 | B |
| | SAMPLE 14-3 | WET | 650 × 5 | GRINDING→ANNEALING | NOT CONTAINED | 6.5 | B |
| | SAMPLE 14-4 | DRY | 650 × 5 | ANNEALING→GRINDING | NOT CONTAINED | 6.5 | B |
| | SAMPLE 14-5 | WET | 650 × 5 | ANNEALING→GRINDING | NOT CONTAINED | 6.5 | B |
| 15 | SAMPLE 15-1 | — | — | — | NOT CONTAINED | 8.1 | C |
| | SAMPLE 15-2 | — | 700 × 3 | ONLY ANNEALING | NOT CONTAINED | 8.0 | C |
| | SAMPLE 15-3 | WET | — | ONLY GRINDING | NOT CONTAINED | 8.1 | C |
| 16 | SAMPLE 16-1 | — | — | — | NOT CONTAINED | 8.2 | C |
| 17 | SAMPLE 17-1 | — | — | — | NOT CONTAINED | 8.0 | C |
| 18 | SAMPLE 18-1 | — | — | — | NOT CONTAINED | 8.5 | D |
| 19 | SAMPLE 19-1 | — | — | — | NOT CONTAINED | 8.5 | D |
| COMPARATIVE EXAMPLES | COMPARATIVE SAMPLE 1 | — | — | — | NOT CONTAINED | 0 | E |
| | COMPARATIVE SAMPLE 2 | — | — | — | NOT CONTAINED | 0 | F |
| | COMPARATIVE SAMPLE 3 | — | — | — | NOT CONTAINED | 0 | E |

EXPLANATION OF REFERENCE NUMERALS

1. MIXED SOLUTION PREPARATION TANK (SOLUTION PREPARING UNIT)
2. RUTHNER FURNACE (ROASTING UNIT)
3. HOPPER
4. CYCLONE COLLECTOR (COLLECTING UNIT)
5. HOPPER (COLLECTING UNIT)
6. CHEMIRITE FURNACE (ROASTING UNIT)
7. PULVERIZING UNIT
8. ROTARY KILN (ANNEALING UNIT)
9. WET-TYPE PULVERIZING TANK
10. SPRAY DRYER
11. HOPPER
12. ACID RECOVERY TOWER (ACID RECOVERY UNIT)

The invention claimed is:

1. A method for manufacturing a multiple oxide, the method comprising:
   a solution preparing step of adding a lithium compound soluble in acidic aqueous solution and an oxoanion raw-material compound to iron and steel pickling waste liquid to prepare a mixed solution;
   a roasting step of introducing the mixed solution into a roasting furnace to roast the mixed solution; and
   a collecting step of collecting the multiple oxide obtained in the roasting step wherein an organic compound which reduces an iron ion in the iron and steel pickling waste liquid is further added in the solution preparing step.

2. The method for manufacturing the multiple oxide according to claim 1, wherein the organic compound is 1) an organic compound which is solid at room temperature and is soluble in acidic aqueous solution, and/or 2) an organic compound which is liquid at room temperature, is soluble in acidic aqueous solution, and has a boiling point of not less than 200° C.

3. The method for manufacturing the multiple oxide according to claim 1, wherein the organic compound is at least one kind of ethylene glycol, triethylene glycol, polyvinyl alcohol, and glucose.

4. The method for manufacturing the multiple oxide according to claim 1, further comprising; a grinding step of grinding the multiple oxide; and/or an annealing step of annealing the multiple oxide.

5. The method for manufacturing the multiple oxide according to claim 1, wherein the oxoanion raw-material compound is at least one kind or more of a phosphorus compound and a silicon compound.

6. The method for manufacturing the multiple oxide according to claim 1, wherein a compound of metal other than iron, which metal is soluble in acidic aqueous solution, is further added in the solution preparing step.

7. The method for manufacturing the multiple oxide according to claim 1, further comprising an acid recovering step of recovering acid generated in the roasting step.

* * * * *